(12) United States Patent
Branning

(10) Patent No.: US 8,808,574 B2
(45) Date of Patent: Aug. 19, 2014

(54) COMPOSITION FOR DUST CONTROL AND LIMITING MOISTURE RE-ABSORPTION

(71) Applicant: Nalco Company, Naperville, IL (US)

(72) Inventor: Merle L. Branning, Plano, IL (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 13/908,067

(22) Filed: Jun. 3, 2013

(65) Prior Publication Data

US 2013/0256589 A1  Oct. 3, 2013

Related U.S. Application Data

(63) Continuation of application No. 12/251,954, filed on Oct. 15, 2008, now abandoned.

(51) Int. Cl.
*C09K 3/22* (2006.01)
*E21F 5/06* (2006.01)

(52) U.S. Cl.
CPC .... *C09K 3/22* (2013.01); *E21F 5/06* (2013.01)
USPC ........................................ 252/88.1; 252/88.2

(58) Field of Classification Search
None
See application file for complete search history.

(56) References Cited

U.S. PATENT DOCUMENTS 5,968,222 A * 10/1999 Kodali .......................... 71/64.07
7,081,270 B2 * 7/2006 Hawkins et al. .............. 427/136

FOREIGN PATENT DOCUMENTS

EP    0 320 987 A1    6/1989
EP    0 320 987 B1    6/1989

* cited by examiner

*Primary Examiner* — Necholus Ogden, Jr.
(74) *Attorney, Agent, or Firm* — Benjamin E. Carlsen

(57) ABSTRACT

The invention provides methods and compositions for the reduction of dust in an environment through application to a hard surface in that environment or dispersal of dust into the environment is minimized. The composition allows for instant reduction of dust and for the elimination of the absorption of moisture on surfaces that are prone to this over time. The invention is usable with mined minerals or synthesized materials that are prone to produce dust and absorb moisture during storage and transport so the composition can allow for a safer environment and longer storage of products.

6 Claims, No Drawings

COMPOSITION FOR DUST CONTROL AND LIMITING MOISTURE RE-ABSORPTION

CROSS-REFERENCE TO RELATED APPLICATIONS

This application is a continuation of U.S. patent application Ser. No. 12/1251,954 filed on Oct. 15, 2008, now abandoned.

STATEMENT REGARDING FEDERALLY SPONSORED RESEARCH OR DEVELOPMENT

Not Applicable.

BACKGROUND OF THE INVENTION

The invention relates to compositions, methods, and apparatuses for improving a dust control product that over time exhibits residual dust control capabilities. The invention discloses a composition and a method for application of the product onto a surface to provide dust control and further allows for residual dust control after the curing process. The invention not only demonstrates initial and residual dust control it additionally limits moisture re-absorption during storage and transport.

Dust suppression is the reduction of the extent to which finely divided solid particulate material becomes suspended in the air. A variety of materials such as coal, sulfur, phosphate, clay, potash and other finely divided ores and minerals, generate dust in transfer and handling operations during mining, transportation, storage, and use.

Dust is a particularly severe safety and health hazard in coal mining, handling, and storage operations. Coal often chips into small fragments by the action of wind and rain, frictional movement due to motion in transit, and abrasion in handling. Respirable coal dust has a particle size of less than about 10 microns and its inhalation can lead to pneumoconiosis, i.e., "black lung disease". Also, dust explosions due to spontaneous combustion may occur when the dust is confined to a small air space such as in coal mining operations.

It is known to suppress dust in mines by spraying with various aqueous systems containing chemical additives to improve working conditions and reduce the toxicological risks and explosion hazards. For example, U.S. Pat. No. 4,425,252 describes a method to abate coal dust using an anionic surfactant, preferably sodium dodecylbenzene sulphonate and a nonionic surfactant, preferably a polyethoxylated nonylphenol, in an aqueous formulation. The method comprises spraying the coal dust area with a formulation comprising water containing up to 0.1% by weight of the mixture of the anionic surfactant, i.e., a water soluble salt of an alkyl aryl sulfonic acid and nonionic surfactant having an HLB of from 10 to 16. Optimally, the mixture contains one or more cosolvents generally of the class of alkylene glycol monoalkyl ethers, $C_2$ to $C_5$ alkanols and mixtures thereof.

Furthermore, several techniques have been developed utilizing foamable compositions for suppressing coal dust. For example, U.S. Pat. No. 4,551,261 describes a foam comprising water, a foaming agent, and an elastomeric water insoluble polymer. A variety of anionic and nonionic surfactants and detergent wetting agents are described as useful foaming agents, and a variety of elastomeric and water insoluble synthetic organic polymer binders are described as useful elastomeric water insoluble polymers.

U.S. Pat. No. 4,971,720 relates to a method for suppressing dust process emissions. The method utilizes a foaming agent which may be a low salt tolerant surfactant selected from salts of fatty acids, alkyl sulphates, and alkyl aryl sulphonates. U.S. Pat. No. 4,561,905 describes a coal dust suppression mixture of oil, water and a surfactant in the form of an emulsion that is diluted and foamed. The foam is then sprayed into a falling mass of coal. The oils suitable for use are described as heavy process oils and include asphalt dissolved in a moderately heavy oil, residual flush oils or relatively high viscosity fuel oil. The preferred oils have a viscosity in the range of from approximately 600 to 7,000 SUS at 38° C., a pour point in the range of approximately −18° to 21° C., a molecular weight of at least 300 and a boiling point of at least 204° C. U.S. Pat. No. 4,944,892 teaches an aqueous composition which comprises a linear primary alcohol ethoxylate surfactant, a suitable scenting oil such as pine oil or lemon oil and water among other adjuvants. U.S. Pat. No. 4,929,278 discloses an aqueous bath preparation which comprises essential oils such as orange peel oil, orange oil, lemon oil or the like. Further, the bath preparation comprises a soap or surfactant which may include straight chain alkyl benzenesulfonates, alkyl sulfuric acid ester, alkyl ether sulfuric acid ester and the like. U.S. Pat. No. No. 3,367,878 shows a composition which comprises 20.2% by weight water, 1.0% by weight pine oil, 1.8% by weight sodium xylene sulphonate surfactant. U.S. Pat. No. 4,175,062 teaches an aqueous composition which comprises 7.5% by weight of sodium dodecylhenzene sulfonate, 0.8% by weight of pine oil and other adjuvants. Japanese Patent 44,495 discloses an aqueous composition which comprises 20% by weight of sodium lauryl benzene sulfonate and 1% by weight of D-limonene along with other adjuvants.

Thus, various techniques have been developed to suppress and control dust especially in the mining of minerals, and many of the techniques are effective for reducing dust. However, there is still a need for improvement in dust suppression. In relation to finely divided ores and mineral mining many of the prior techniques were developed without a need to address problems associated with modern mining practices.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR §1.56(a) exists.

BRIEF SUMMARY OF THE INVENTION

To satisfy the long-felt but unsolved needs identified above, at least one embodiment of the invention is directed towards controlling dust at least one embodiment of the invention is a composition for use in dust control on surfaces Which is particularly effective in mineral mining, processing and storage environments. The product is effective for use in the mining sector because it also reduces moisture re-absorption during storage and transport of the minerals. Further the invention relates to the method of use of the composition in relation to dust reduction and long term dust control.

In at least one embodiment the composition may be used to include dust control where the solids are selected from the group consisting of coal, clean coal, bauxite, iron ore, copper ore, sand, gravel, clay, dirt, phosphate rock, lead/zinc, taconite, beryllium, Trona, kaolin, titania, uranium, precious metals and the like. More than one type of solids may be present to the total surface for dust control.

Additional features and advantages are described herein, and will be apparent from, the following Detailed Description.

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category.

"Transport Component" means a fluid which is used at least in part to transport other reagents, it may be a carrier oil which may also be a hydrocarbons extracted from petroleum crude oil (for example: low odor paraffin solvent, Escaid 110 solvent Exxon, Mineral Oils) or from crop sources, such as, Biodiesel, that is derived from corn, soybeans, or other crop sources.

"Dispersant" means a composition of matter which aids in affording a reagent superior surface coverage, it may be derived from natural or synthetic sources (for example: orange oil, pine oil, essential oils, terpenes, cationic, nonionic, cationic and anionic ethoxylated surfactant materials and blends, thereof).

"Surface Modifying Agent" means a composition of matter such as an elastomer which increases the tackiness of a material that it is added to, it includes materials derived from rubber sources either natural (natural rubber latex, Union Carbide, NC-358) or synthetic (polyisoprene suspension, Kraton IR 01).

"Coupling Agent" means a composition of matter which aids in homogenously blending the constituent components of composition, it includes materials derived from natural sources, such as, soybeans and other crops, as well as phospholipids such as ALC, Alcotec S, sold by American Lecithin Company.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the Kirk-Othmer Encyclopedia of Chemical Technology, 5th Edition, (2005), (Published by Wiley, John & Sons, Inc.) this definition shall control how the term is to be defined in the claims.

At least one embodiment of the invention is directed towards a dust control composition comprised of an effective amount of a transport component, a dispersant and a surface modifying agent. This composition is for use on a wide variety of surfaces to assist in the dust reduction in an open or closed environment.

In at least one embodiment the dust control composition can also include a coupling agent that can assist in the overall appearance of the composition by making it more homogenous. The coupling agent may be a surfactant preferable one or more phospholipids.

In at least one embodiment the composition contains a transport component that can be a mixture of synthetic oils or natural oils. The preferred transport components are one or more of the following: biodiesel, mineral oils, low odor paraffin solvent, Escaid 110 solvent Exxon and paraffinic oils. Also the composition may include a curing control agent which can be used to control the curing time so it can be varied depending on the surface and the environment.

In at least one embodiment the dispersant component of the composition is preferably one or more of the following: orange oil, pine oil, essential oil, terpenes, cationic ethoxylates, nonionic ethoxylates, propoxylates and anionic ethoxylates.

In at least one embodiment the surface modifying agent of the composition can be derived from a natural source, such as natural rubber latex, or a synthetic source, such as a polyisoprene suspension.

In at least one embodiment the dust control composition contains the components in the following ranges; 50 to 98 percent transport component, 0.05 to 10 percent dispersant, 0.05 to 20 percent surface modifying agent and 0.1 to 50 percent coupling agent. The dust control composition has the components in the preferred range of 80 to 90 percent transport component, 0.5 to 2 percent dispersant, 0.5 to 5 percent surface modifying agent and 5 to 20 percent coupling agent.

In at least one embodiment the invention further includes a method using the dust control composition wherein it is applied to a surface in an effective amount to allow for the immediate elimination of dust particles and remain effective for an extended period of time. The composition is applied with a properly engineered spray bar or application device. The application of the composition is done with an effective amount to control residual dust for the storage or transportation of the surface and to prevent moisture re-absorption during storage and transport. The composition can be used on a wide variety of surfaces including but not limited to mined minerals, synthesized dry material, roads, coal, potash and/or phosphate.

EXAMPLES

The foregoing may be better understood by reference to the following examples, which are presented for purposes of illustration and are not intended to limit the scope of the invention. In particular the examples demonstrate representative examples of principles innate to the invention and these principles are not strictly limited to the specific condition recited in these examples. As a result it should be understood that the invention encompasses various changes and modifications to the examples described herein and such changes and modifications can be made without departing from the spirit and scope of the invention and without diminishing its intended advantages. It is therefore intended that such changes and modifications be covered by the appended claims.

The testing is conducted using a drop box apparatus where the dust control effectiveness of the claimed invention is demonstrated. The majority of the drop box apparatus is a hollow aluminum piece with a movable steel plate at the top of the apparatus where the sample is loaded and a detection system at the bottom consisting of a laser, power supply, detector, and removable piece necessary for cleaning. The system sits on a base that has an insert, which fits inside the aluminum part. The following is the test procedure used to evaluate the samples in the examples.

Sample Prep

Only dry samples can be tested using this device. If required, the materials were ground to dust in a ceramic container tilled with steel spheres. Numerous spheres were placed into the ceramic container with the material to be tested and allowed to roll for a predetermined time period. The particles are then sifted through a #30 mesh screen to separate out larger particles. The material is then heated to the appropriate temperature in an 180° F. oven for one hour (if required). The appropriate amount of dust control agent is applied onto the dust, while still in the oven (if required), and mixed thoroughly. The dust material dosed with dust control agent is then allowed to cool to room temperature prior to testing in the drop box apparatus.

Sampling Procedure

Turn on the drop box detection system and begin data acquisition system. Secure the steel tray in a horizontal position using a magnet. Load a predetermined amount of sample onto the swing down tray (sample size of 5-15 g). Capture the data from HyperTerminal. Begin trial by connecting to the detection system. Officially start recording optical densities. The detector will now determine the amount of light scattering over time. A baseline is found first to ensure no contaminants are in the laser field. After a baseline is set, the magnet can be removed causing the sample to drop down the apparatus resulting in an increase in optical density. After a predetermined amount of time the data collecting is stopped.

Example 1

Fine Langbeinite Standard

SAMPLE Y: 98% Transport component, 1% dispersant and 1% surface modifying agent.

| Sample | Sum Under Curve (T = 0, $10^x$) | % Reduction from blank (T = 0) |
|---|---|---|
| Blank | $4.47 \times 10^5$ | NA |
| 0.5 gal/ton/Y | $5.34 \times 10^4$ | 88.84 |
| 1.0 gal/ton/Y | $3.65 \times 10^4$ | 92.38 |
| 1.5 gal/ton/Y | $2.68 \times 10^4$ | 94.39 |

Example 2

Coal

Sample Z was composed of:

| | |
|---|---|
| 79.4% | transport component |
| 1.6% | dispersant |
| 3.2% | surface modifying agent |
| 15.8% | a coupling agent |

| Dose and Sample | Sum Under Curve (T = 0, $10^x$) | % Reduction from blank (T = 0) |
|---|---|---|
| Blank | $4.70 \times 10^6$ | NA |
| 10 gm/500 gm/Z | $2.90 \times 10^6$ | 38.33 |
| 20 gm/500 gm/Z | $1.87 \times 10^6$ | 60.13 |
| 50 gm/500 gm/Z | $1.80 \times 10^3$ | 99.96 |

Example 3

Fine Langbeinite Standard

Sample A was composed of:

| | |
|---|---|
| 79.4% | transport component |
| 1.6% | dispersant |
| 3.2% | surface modifying agent |
| 15.8% | a coupling agent |

Sample B was composed of:

| | |
|---|---|
| 88% | transport component |
| 1% | dispersant |
| 1% | surface modifying agent |
| 10% | a coupling agent |

| Dose and Sample | Sum Under Curve (T = 0, $10^x$) | % Reduction from blank (T = 0) |
|---|---|---|
| Blank | $4.79 \times 10^5$ | NA |
| 0.5 gal/ton/A | $4.45 \times 10^4$ | 90.69 |
| 0.5 gal/ton/B | $4.20 \times 10^4$ | 91.23 |
| 1.0 gal/ton/A | $4.45 \times 10^4$ | 90.71 |
| 1.0 gal/ton/B | $4.26 \times 10^4$ | 91.10 |
| 1.5 gal/ton/A | $4.60 \times 10^4$ | 90.38 |
| 1.5 gal/ton/B | $3.11 \times 10^4$ | 93.51 |
| 2.0 gal/ton/A | $2.99 \times 10^4$ | 93.76 |
| 2.0 gal/ton/B | $3.89 \times 10^4$ | 91.88 |

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments mentioned herein, described herein and/or incorporated herein. In addition the invention encompasses any possible combination that also specifically excludes any one or some of the various embodiments mentioned herein, described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of dust control comprising applying a composition onto a surface in an amount effective to allow for the immediate elimination of dust particles and remain effective for an extended period of time, wherein the composition comprises a transport component, a dispersant, a surface modifying agent, and one or more phospholipids, wherein the dispersant is selected from the group consisting of orange oil, pine oil, essential oil, terpenes, cationic ethoxylates, nonionic ethoxylates, propoxylates, anionic ethoxylates, and any combination thereof, and wherein the composition comprises about 80 to 90 percent transport component, 0.5 to 2 percent dispersant, 0.5 to 5 percent surface modifying agent and 5 to 20 percent of the one or more phospholipids and wherein the surface is located in a closed environment.

2. The method of claim 1, wherein the composition is applied with a properly engineered spray bar or application device.

3. The method of claim 1, wherein the composition is applied in an amount effective to control residual dust during the storage or transportation of the surface.

4. The method of claim 1, wherein the surface is one item selected from the group consisting of a mined mineral, a synthesized dry material, coal, potash, phosphate, and road dust.

5. The method of claim 1, wherein the transport component comprises a mixture of synthetic oils or a mixture of natural oils.

6. The method of claim 1, wherein the composition comprises a curing control agent.

* * * * *